United States Patent
Bates et al.

(10) Patent No.: US 6,952,559 B2
(45) Date of Patent: Oct. 4, 2005

(54) DIGITAL RADIO AD ENHANCEMENTS

(75) Inventors: Cary Lee Bates, Rochester, MN (US); Robert James Crenshaw, Apex, NC (US); Paul Reuben Day, Rochester, MN (US); John Matthew Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 713 days.

(21) Appl. No.: 09/793,140

(22) Filed: Feb. 26, 2001

(65) Prior Publication Data

US 2002/0119752 A1 Aug. 29, 2002

(51) Int. Cl.[7] .......................... H04H 1/00; H04H 7/00; H04B 7/14; H04B 1/40; G06F 17/60
(52) U.S. Cl. .................. 455/3.06; 455/18; 455/301; 455/86; 455/87; 705/14
(58) Field of Search .................. 455/18, 3.01, 3.06, 455/86, 87; 705/14, 15

(56) References Cited

U.S. PATENT DOCUMENTS

| 4,973,952 A | 11/1990 | Malec et al. |
| 5,627,549 A | 5/1997 | Park |
| 5,664,948 A | 9/1997 | Dimitriadis et al. |
| 5,682,525 A | 10/1997 | Bouve et al. |
| 5,848,397 A | 12/1998 | Marsh et al. |
| 6,009,409 A | 12/1999 | Adler et al. |
| 6,615,039 B1 * | 9/2003 | Eldering ..................... 455/418 |
| 2002/0184091 A1 * | 12/2002 | Pudar | |

OTHER PUBLICATIONS

Marcus, Method and Apparatus for Creation, Distribution, Assembly and Verification of Media, Jul. 11,2002, Patent Application Publication.*

* cited by examiner

*Primary Examiner*—Vivian Chin
*Assistant Examiner*—Yuwen Pan
(74) *Attorney, Agent, or Firm*—Martin J. McKinley; Dillon & Yudell LLP

(57) ABSTRACT

A digital radio stores advertisements for substitution during a broadcast for a bumpable advertisement within the broadcast. Upon detecting a bumpable advertisement within a predetermined broadcast period, the digital radio checks for higher priority stored advertisements—such as advertisements which were broadcast when the digital radio was not tuned to the station being monitored—and substitutes advertisements according to a priority scheme. Prioritization includes whether the advertisement has been played to the listener at least once during the broadcast period, and may extend to fee-based priority enhancements and tie-breakers or to selection based upon geographic location and/or direction of travel of a vehicle in which the digital radio is located.

14 Claims, 2 Drawing Sheets

DIGITAL RADIO AD ENHANCEMENTS

BACKGROUND OF THE INVENTION

1. Technical Field

The present invention generally relates to a digital audio broadcast system and in particular to selective broadcasting to digital audio broadcast receivers. Still more particularly, the present invention relates to selective broadcasting of commercial advertisements to mobile digital radios.

2. Description of the Related Art

Digital radios have become common around the world, with some statistics showing that digital radios reach over one third of the population in Europe and Canada. As with analog radio broadcasts, digital radio broadcasts may include commercials or advertisements. The advent of digital radio, however, presents many opportunities for new tools which commercial radio broadcasters may utilize to optimize their return on investment through advertising.

One of the key problems with either broadcast method is that many advertisers compete for limited available advertising (ad) slots during a broadcast program. Ad slots may not be utilized efficiently, and advertisers may buy multiple slots for more exposure to the listeners. In some instances, an advertiser may want the listener to hear the same commercial repeatedly in order to condition the listener's recall, as in the case with pizza or fast food advertisements. Other times, however, an advertiser wishing only to inform listeners of some special event may buy multiple slots in the hope that the listener will hear the advertisement at least once (or some number of times).

An example of the latter case is a circus, which may advertise the appearance of the circus in a particular town on certain dates. The main goal of the advertisement is to inform listeners that the circus is coming and, generally, a listener who has heard the advertisement once does not need to hear that advertisement repeatedly. However, to make sure that a high percentage of listeners of a given radio station hear the advertisement at least once, the circus may buy multiple ad slots at different times. The circus may, for instance, purchase four slots and pay $1,000 for those slots.

However, if some mechanism existed ensuring that the same number of listeners would hear the advertisement using only two time slots, the broadcaster could sell effectively the same advertising to the circus for less total cost while charging more on a per-slot basis, saving the circus money and increasing the broadcaster's revenue. That is, if the broadcaster could sell two time slots of the original four to the circus for $700, reaching the same number of listeners, and also sell the remaining two time slots for $700, the broadcaster could receive $1,400 for the four time slots rather than $1,000. The circus would save $300 while receiving the same advertising exposure, creating a win-win situation. In addition, the listener will also benefit because the automatic selection bias towards previously unheard or less heard ads will reducing the number of ads the listener hears repeatedly. Thus, there is a win-win-win situation for the advertiser, broadcaster, and listener.

It would be desirable, therefore, to improve the efficiency of broadcast commercials in reaching targeted listeners.

SUMMARY OF THE INVENTION

It is therefore one object of the present invention to provide a method and system for efficiently receiving digital audio broadcast advertisements.

It is another object of the present invention to provide a method and system for enhancing digital radio advertisement coverage.

It is yet another object of the present invention to provide a method and system for enhancing ad revenues for a radio station without increasing the cost to broadcast.

The foregoing objects are achieved as is now described. A digital radio stores advertisements for substitution during a broadcast for a bumpable advertisement within the broadcast. Upon detecting a bumpable advertisement within a predetermined broadcast period, the digital radio checks for higher priority stored advertisements—such as advertisements which were broadcast when the digital radio was not tuned to the station being monitored—and substitutes advertisements according to a priority scheme. Prioritization includes whether the advertisement has been played to the listener at least once during the broadcast period, and may extend to fee-based priority enhancements and tie-breakers or to selection based upon geographic location of a vehicle in which the digital radio is located.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
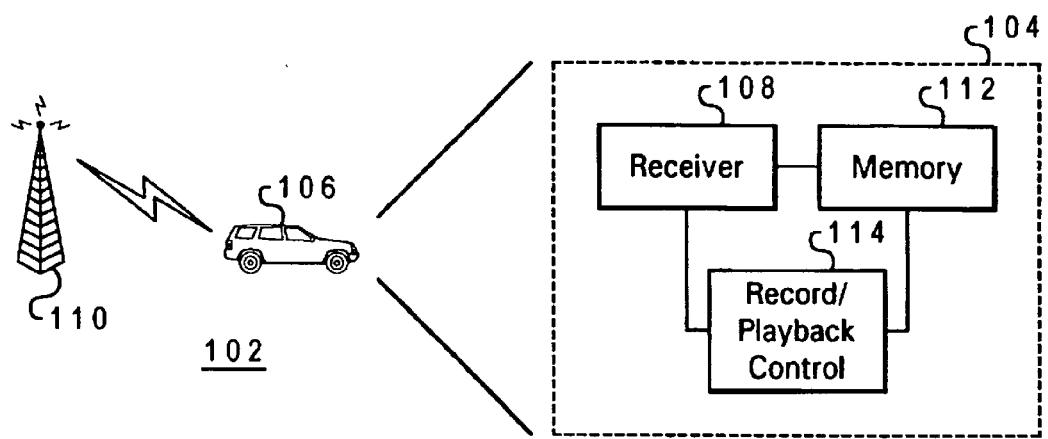
FIG. 1 depicts a high-level diagram of a digital audio broadcast system in accordance with a preferred embodiment of the present invention.

With reference now to the figures, and in particular with reference to FIG. 1, a high-level diagram of a digital audio broadcast system in accordance with a preferred embodiment of the present invention is depicted. The present invention may be employed in digital radio broadcast equipment of the type known in the art, and only so much of such digital radio broadcast equipment as is different from that known in the art or necessary for an understanding of the invention is shown.

From an advertiser's point of view, the main problem with radio advertising is that listeners often channel surf when advertisements are being played or when a song is played which the listener does not like and/or does not wish to hear. As a result, if a particular program has five sponsors, the listener may hear advertisements by one sponsor several times, yet miss every airing of the advertisements for another sponsor. The present invention makes use of the digital technology available in digital radios to track the advertisements which have been broadcast from a particular station and to "bump" selected advertisements which the listener has already heard in favor of advertisements which were aired but not heard by the listener (e.g., because the receiver was temporarily switched to a different station).

Digital radio broadcast system 102 in the present invention includes a digital radio 104, which in the exemplary embodiment is disposed within a vehicle 106. Digital radio 104 includes a digital radio receiver 108 capable of receiving and playing a digital radio broadcast from broadcast tower 110 on the audio system (not shown) within vehicle 106. Digital radio 104 also includes a memory 112 and a record/playback control unit 114 each connected to the receiver 108 and to each other. Digital radio operates in the manner described below to control airing of advertisements to the listener to improve the effectiveness of broadcast commercials in reaching targeted listeners.

Figure 2:
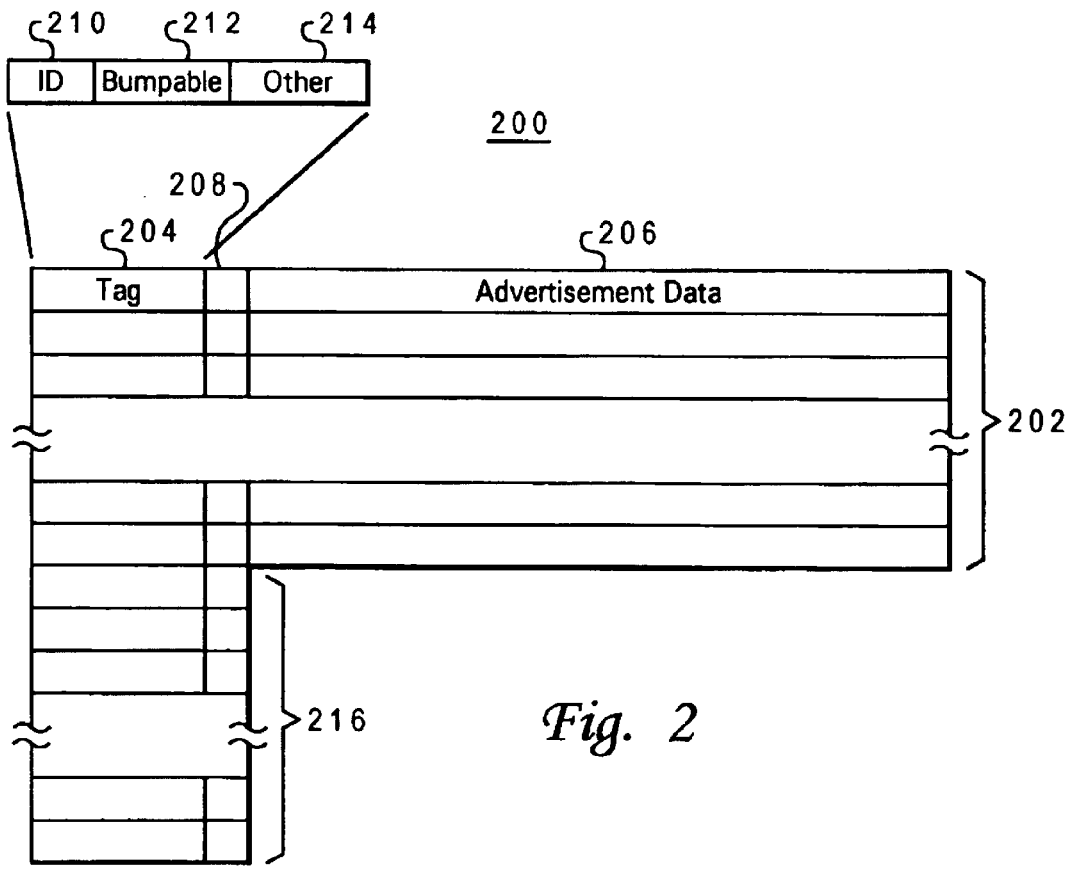
FIG. 2 is a data structure employed for saving advertisements within the memory of a digital radio in accordance with a preferred embodiment of the present invention.

Referring to FIG. 2, a data structure employed for saving advertisements within the memory of a digital radio in accordance with a preferred embodiment of the present invention is illustrated. Data structure 200 includes a plurality of entries 202 each containing a different stored advertisement. An entry may include a tag 204, the advertisement playback data 206, and a flag or counter 208 indicating whether the advertisement has been heard by the listener and/or how many times within a given period the advertisement has been heard by the listener.

Tag 204 includes a unique identifier 210 for the advertisement, and in broadcasting of the advertisement may be both prepended to the beginning of the advertisement and appended to the end of the advertisement. Tag 204 also includes a flag or other indicator 212 identifying whether the advertisement is "bumpable," as described in further detail below, and other data 214 such as a category, global positioning system coordinates, some trivial command information, etc.

Data structure 200 may optionally include entries 216 that contain only tag 204 for each advertisement which the listener has already heard (i.e., the receiver 108 was tuned to a station while the advertisement was being broadcast) and an associated counter 208 indicating the number of times which the listener has heard the corresponding advertisement.

The present invention is activated after the digital radio 104 is tuned to a single radio station for some threshold amount of time and/or within some predefined broadcast period. Once the invention is activated, the digital radio 104 tracks advertisements being broadcast on the station by saving at least the tags 204 and/or the unique identifiers 210 for the advertisements. Once the invention is activated, if the listener switches from a first station to a second station, digital radio 104 continues to monitor the first station for at least some set amount of time. If an advertisement is broadcast on the first station which was not heard by the listener (and has not already been saved), digital radio 104 saves the advertisement. Should the listener subsequently switch back to the first station and a bumpable advertisement is played on the first station which the listener had previously heard, digital radio 104 plays the saved advertisement instead. In this manner both advertisers (the advertiser sponsoring the "bumped" advertisement and the advertiser sponsoring the saved advertisement) are assured that their advertisement is heard at least once by this listener.

Sufficient controls may be easily added to give radio stations control over when the period during which a saved advertisement is reset (e.g., at the top of every hour). Moreover, not every advertisement need be bumpable, since some advertisers may not want their advertisement bumped from a given time slot. Advertisers who simply want to make sure their advertisement is heard at least once (or some other number of times) within a given broadcast period should be willing to be bumped in favor of another advertisement if the listener has already heard their advertisement the predetermined number of times.

For the purposes of the exemplary embodiment, two basic advertisement types may be employed to optimize the exposure which the advertiser receives for their fee:
1) "Non-bumpable" (traditional) advertisements which are broadcast during a particular time slot and are either heard by the listener at that time or not; and
2) "Bumpable" (new type) advertisements which may be buffered and allocated to available advertising slots.

More advertisement types may be created using the controls of the present invention, but this description will address only these two types for the sake of simplicity and clarity.

By mixing these two types of advertisements during a given broadcast period, a radio station could maximize the price of each slot while ensuring a certain level of exposure. For example, suppose a radio station airs four commercial breaks during a given broadcast period (one hour), with three advertisement slots in each commercial break (twelve advertisement slots total). In keeping with saturation advertising, a fast-food vendor (F) might purchase one advertisement slot during each commercial break, desiring that the listener hear the advertisement each time (unless the listener has switched stations), requiring that the advertisements be non-bumpable.

Of the remaining eight advertisement slots, a jeweler (J) may purchase two and a beer vendor (B) may purchase four. Wanting only to be heard at least once, the jeweler and the beer vendor may purchase bumpable advertisement slots. If the circus (C) wishes to make their presence known as described above, the remaining two slots may be sold for bumpable advertisements to the circus. Originally the circus may have wished to purchase four advertisement slots, one during each commercial break, in order to reach a certain number of listeners at least once during the broadcast period. The issue, then, is whether purchasing two bumpable advertisement slots would result in the advertisement being heard at least once by a number of listeners which is greater than or equal to the number of listeners who would have heard the advertisement at least once with four traditional advertisement slots.

One possible layout of the advertisements for the subject broadcast period might be:

BCF, JFB, FCB, FBJ where "B" is the beer vendor's advertisement, "C" is the circus advertisement, "F" is the fast-food vendor's advertisement, and "J" is the jeweler's advertisement. Because two slots during each commercial break are bumpable, however, there are actually six slots within the above layout during which the circus advertisement might be heard by a given listener (underlined below):

B<u>C</u>F, J<u>FB</u>, <u>FCB</u>, <u>FBJ</u>.

Of twelve total slots, the fast-food vendor's advertisements are not bumpable. The beer vendor's and jeweler's advertisements cannot be bumped until the listener has heard them at least once, and therefore cannot be bumped the first time they are played (because they could not have been heard if they were not yet played). Once a bumpable advertisement has been heard at least once by the listener, slots during subsequent commercial breaks in which that advertisement is broadcast may be preempted for another bumpable advertisement, previously saved by the digital radio when the listener switched stations. This leaves four opportunities (underlined and boldfaced above) for the circus advertisement to bump another advertisement if necessary, in addition to the two scheduled slots for the circus advertisement.

If the circus advertisement has not been heard by the listener when any of the bumpable advertisement slots comes up, but the (bumpable) advertisement scheduled for that slot has been heard by the listener, the circus advertisement may be played by the digital radio in place of the advertisement broadcast during that slot. For instance, if the listener switched stations prior to airing of the first commercial break and during the airing of the third commercial break, but was tuned into the station throughout the second commercial break and during and after airing of the first advertisement during the fourth commercial break, the advertisement sequence might be represented by:

bcf, JFB, fcb, FBJ, where lowercase letters identify broadcast advertisements not heard by the listener and underlining identifies advertisements which might be bumped in favor of circus advertisement. The circus advertisement would be replayed by the listener's digital radio in lieu of the beer vendor's advertisement during the fourth commercial break.

Note that the circus advertisement would never be heard more than twice by any given listener during the subject broadcast period (having been heard twice, the circus advertisement would no longer bump the broadcast advertisements), but the number of listeners who would hear the circus advertisement at least once during the subject broadcast period will equal, or at least approach, the same number of listeners who would have heard the advertisement at least once if the circus advertisement was broadcast six times during the broadcast period. In terms of reaching the listener at least once, the circus comes out ahead of where they would be if they had purchased four traditional slots.

In the case where a particular listener remains tuned to the station for the entire broadcast period, nothing need be buffered and no advertisements need be bumped, since all advertisements are heard in the original broadcast order. Moreover, the bumping operates in favor of any bumpable advertisement during a particular broadcast period. For instance, suppose a listener hears the first block of advertisements during the first commercial break, then surfs away or is tuned out during the second commercial break but returns for the last two commercial breaks:

BCF, jfb, FCB, FBJ.

In this case, when the third commercial break airs, the listener has already heard the beer vendor's advertisement and the circus advertisement once already, but not the jeweler's advertisement. Therefore the jeweler's advertisement is played to the listener during the next bumpable advertisement slot (when the circus advertisement is bumped during the third commercial break). During the fourth commercial break, since all bumpable advertisements have been heard at least once, the broadcast advertisements are played normally to the listener with no advertisements replaced.

Note that during the fourth commercial break, since both the circus advertisement and the jeweler's advertisement have been heard only once while the beer vendor's advertisement has been heard only three time, some provision may be made to fairly (or otherwise) determine which advertisements to play during the bumpable slots for the fourth commercial break. Randomness might be utilized to fairly equalize the number of times advertisements are heard by possibly bumping advertisements which had previously bumped other advertisements so that all advertisers paying for the same number of slots have about the same chance, on average, of being heard twice.

Alternatively, a higher priced bumpable advertisement could bump other bumpable advertisements once those bumpable advertisements had been heard at least some predefined number of times during a subject broadcast period (a "preferred" or highest priority bumpable advertisement category). Similarly, a lower cost bumpable advertisement might be bumped by any other bumpable advertisement once it had been heard once (a lowest priority bumpable advertisement category). Additionally, a higher priced bumpable advertisement might have higher priority over other bumpable advertisements in bumping a particular advertisement slot (a fee-based tie-breaker for multiple bumpable advertisements each seeking to bump the first bumpable advertisement within a given broadcast period).

In the case of digital radios within moving vehicles, the current global positioning system (GPS) location of the vehicle may be utilized to determine which advertisement to bump or which advertisement to play in lieu of a bumped advertisement. For example, if the GPS location of two advertisers' retail locations are available, the GPS location of the vehicle may be employed to determine which advertiser's location is closest, or two GPS locations taken some amount of time apart may be employed to determine whether the vehicle is currently moving toward or way from either advertiser's location. The advertisement corresponding to the closest retail location might be played in lieu of the bumped advertisement, or the advertisement corresponding to the retail location within the vehicle path may be employed to either select or tie-break between two advertisements (i.e., choose the advertisement corresponding to the retail location towards which the vehicle is moving, not an advertisement corresponding to a retail location which the vehicle is moving away from).

In addition to saving the identifiers for advertisements which the listener has already heard, the digital radio might also save the advertisements themselves. If an advertisement is broadcast which the listener has heard several times during a broadcast period, and the vehicle containing the digital radio is approaching a retail location (e.g., a franchise for the fast-food vendor) corresponding to an advertisement which the listener has also already heard before, the broadcast advertisement may be bumped in favor of the advertisement corresponding to the nearby retail location. The target location(s) for advertisements should be broadcast with the advertisement.

If not all advertisements which the listener has heard are saved, and the digital radio must determine which of the heard advertisements to save, the direction of travel over time and the movement of the vehicle relative to the target location(s) may be employed to determine whether to save a particular advertisement which the user originally hears as broadcast. Alternatively, certain bumpable advertisements may be designated for saving (e.g., those for fast-food franchises) while other are not (e.g., the circus advertisement) since the location of the listener is not relevant. Heard advertisements which are saved may be discarded after having been played some upper-limit number of times.

Figure 3:
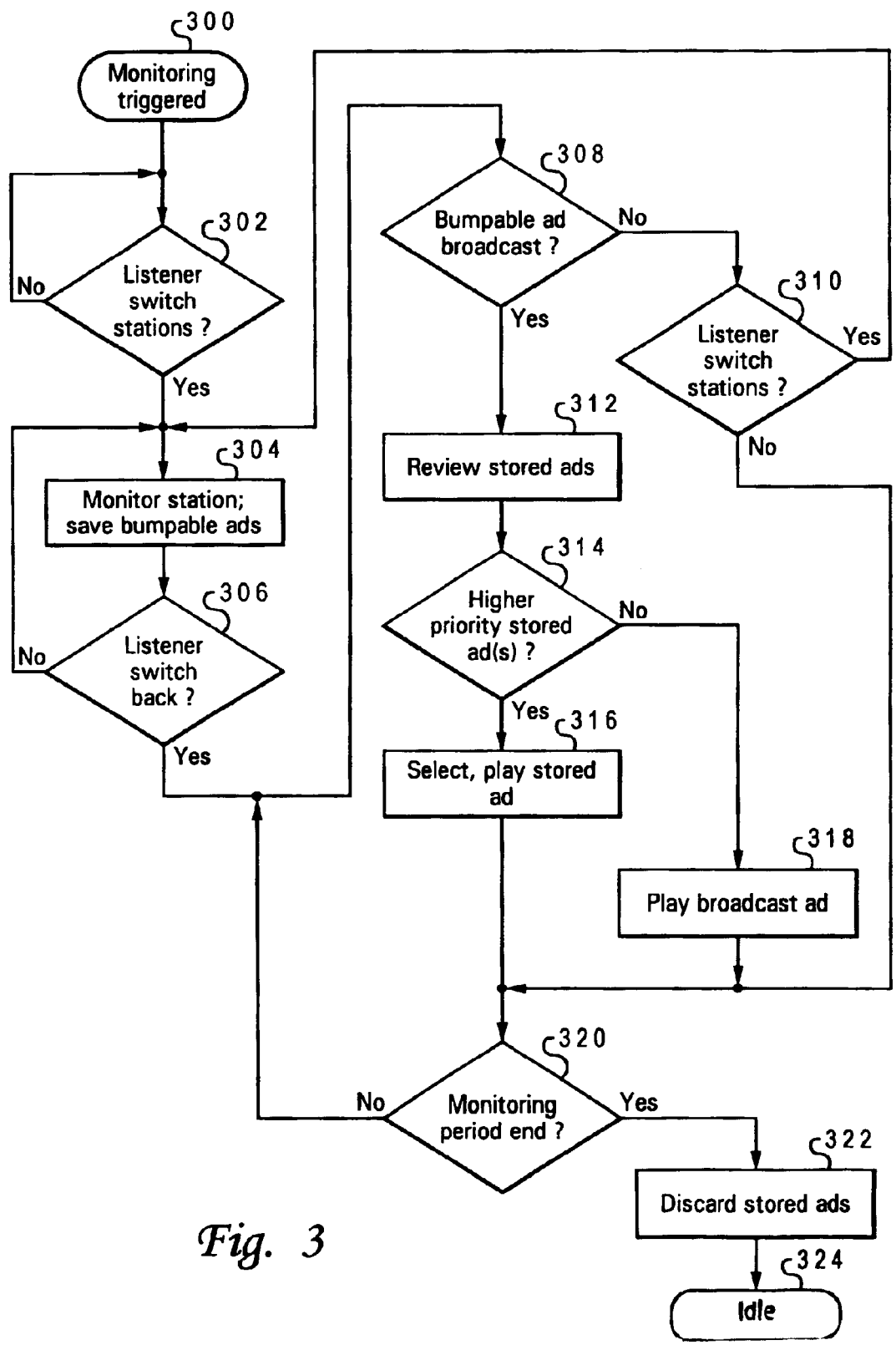
FIG. 3 depicts a high level flow chart for a process of storing and bumping advertisements within a digital radio in accordance with a preferred embodiment of the present invention.

With reference now to FIG. 3, a high level flow chart is shown for a process of storing and bumping advertisements within a digital radio in accordance with a preferred embodiment of the present invention. The process begins at step 300, which depicts triggering monitoring of the listener's use of a digital radio with respect to a particular station. The trigger event may simply be the user tuning to the station during a given broadcast period, or may also require the user to listen to the station for some prescribed period of time.

Alternatively, monitoring may be triggered by the beginning of a new broadcast period, particularly if the listener has preprogrammed a tuning button on the digital radio to tune the digital radio to the subject station. It should be noted that the process depicted may be concurrently performed by the digital radio for a number of different stations and/or broadcast periods.

The process first passes to step 302, which illustrates a determination of whether the user has switched to a different station. This step may be unnecessary in some implementations, such as where the user's pre-saved one-touch tuning stations are being monitored without regard to the user's listening to each station. If necessary, however, and if the user has switched stations, the process passes to step 304, which depicts monitoring the subject station and saving any bumpable advertisements broadcast while the digital radio is not tuned to the subject station.

The process passes next to step 306, which illustrates a determination of whether the listener has switched (back) to the subject station. If not, the digital radio continues to monitor the subject station and save bumpable advertisements which are broadcast. If so, however, the process proceeds instead to step 308, which depicts a determination of whether a bumpable advertisement is being broadcast on the subject station. If not, the process proceeds to step 310, which depicts a check of whether the listener has switched stations.

When a bumpable advertisement is broadcast while the digital radio is tuned to the subject station, the process passes to step 312, which illustrates reviewing any stored advertisements, and then to step 314, which depicts a determination of whether any stored advertisements have a higher priority than the bumpable advertisement being broadcast. For example, if the bumpable advertisement was previously broadcast while the digital radio was tuned to the subject station, a stored advertisement which was not broadcast while the digital radio was tuned to the subject station will have a higher priority. Other variants of prioritization among bumpable advertisements have been described above.

If a stored advertisement has a higher priority than the bumpable advertisement being broadcast, the process proceeds to step 316, which illustrates selecting and playing a stored advertisement in place of the bumpable advertisement being broadcast. Selection of a stored advertisement from among a number of possible candidates may involve utilization of the prioritization schemes previously described. If no stored advertisement has a higher priority than the bumpable advertisement being broadcast (or if the bumpable advertisement being broadcast wins in a random selection among the broadcast advertisement and one or more stored advertisements having an equal priority), the process proceeds instead to step 318, which depicts playing the broadcast advertisement.

The process then passes to step 320, which illustrates a determination of whether the monitoring period has ended (e.g., the current broadcast period terminates). If not, the process continues to monitor for broadcast of bumpable advertisements and/or listener activity in the tuning of the digital radio. If the monitoring period has ended, however, the process proceeds to step 322, which depicts discarding any stored advertisements, and then to step 324, which illustrates the process becoming idle until monitoring of a subject station is again initiated (e.g., by the start of a new broadcast period).

In the foregoing description, it should be noted that in some embodiments of the invention the determinations made at steps 302, 306 and 310 may also encompass situations in which the listener powers the radio off and on, as well as when the listener switches from and returns to a subject broadcast station. For example, if a listener powers off the radio for an interval (e.g., by turning off the automobile ignition) and then powers on the radio with the radio tuned to the same station, this scenario could be handled similarly to the station switching scenario described above, with the exception that the broadcast ads would not be stored during the interval while the radio is powered off. However, upon power on, bumpable ads could still be identified, and stored ads could be played in lieu of the bumpable ads. And if the radio is powered off while the automobile is still running, the monitoring operations of FIG. 3 could be performed as illustrated, although possibly for only a selected time period.

The present invention allows digital radio advertisers to more effectively achieve their goals (e.g., saturation versus one-time contact) by creating different categories of advertisements, including a "bumpable" advertisement which may be supplanted for a particular listener by a different advertisement to ensure that the maximum number of listeners hear the supplanting advertisements at least once during a predetermined broadcast period. By creating a bumpable advertisement category, different priority schemes become possible such a fee-based priority enhancements (or downgrades), fee-based or random selection tie-breaking, or selection among multiple possible advertisements based on the current geographic location and/or direction of movement for the digital radio.

It is important to note that while the present invention has been described in the context of a fully functional digital audio broadcast system, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention. For example, those skilled in the art that various measures may be employed to determine whether or not an advertisement has been heard, for example, in the situation that a listener switches stations during an ad. In some embodiments, it may be desirable for an ad to be counted as "heard" if the radio is tuned to the station for the complete presentation of the ad. However, in other embodiments or for particular ads, it may be desirable for an ad to be counted as "heard" if a lesser percentage or a particular portion of the ad is presented.

What is claimed is:

1. A method for enhancing radio advertisement, comprising:

detecting a bumpable advertisement including an identifier within a digital radio broadcast;

responsive to detecting the bumpable advertisement within the broadcast, checking stored advertisements within a digital radio tuned to the digital radio broadcast for a stored advertisement having a higher priority than the bumpable advertisement within the broadcast;

responsive to locating a stored advertisement having a higher priority than the bumpable advertisement within the broadcast, suppressing play of the bumpable advertisement within the broadcast by the digital radio and playing the higher priority stored advertisement in lieu of the bumpable advertisement utilizing the digital radio;

monitoring the broadcast utilizing the digital radio even when the digital radio is not tuned to the broadcast;

storing selected advertisements within the broadcast in the digital radio when the digital radio is not tuned to the broadcast, wherein the step of storing selected advertisements within the broadcast within the digital radio when digital radio is not tuned to the broadcast further comprises storing bumpable category advertisements which are broadcast while the digital radio is not tuned to the broadcast;

wherein the step of checking stored advertisements within a digital radio tuned to the digital radio broadcast for a stored advertisement having a higher priority than the bumpable advertisement within the broadcast further comprises:

determining whether the bumpable advertisement was previously broadcast during a given broadcast period while the digital radio was tuned to the broadcast;

determining whether any stored advertisement was previously broadcast during the given broadcast period while the digital radio was not tuned to the broadcast; and responsive to determining that the bumpable advertisement was previously broadcast during the given broadcast period while the digital radio was tuned to the broadcast and identifying at least one bumpable category stored advertisement which was previously broadcast during the given broadcast period while the digital radio was not tuned to the broadcast, selecting the at least one bumpable category stored advertisement which was previously broadcast during the given broadcast period while the digital radio was not tuned to the broadcast as the higher priority stored advertisement.

2. The method of claim 1, further comprising:

responsive to identifying more than one bumpable category stored advertisements which were previously broadcast during the given broadcast period while the digital radio was not tuned to the broadcast, randomly selecting the one of the bumpable category stored advertisements which were previously broadcast during the given broadcast period while the digital radio was not tuned to the broadcast as the higher priority stored advertisement.

3. The method of claim 1, further comprising:

responsive to identifying more than one bumpable category stored advertisements which were previously broadcast during the given broadcast period while the digital radio was not tuned to the broadcast, selecting an advertisement which commands a largest fee from among the bumpable category stored advertisements which were preciously broadcast during the given broadcast period while the digital radio was not tuned to the broadcast as the higher priority stored advertisement.

4. The method of claim 1, further comprising:

responsive to identifying more than one bumpable category stored advertisements which were previously broadcast during the given broadcast period while the digital radio was not tuned to the broadcast, selecting an advertisement as the higher priority stored advertisement based on target geographic locations associated with each of the bumpable category stored advertisements which were previously broadcast during the given broadcast period while the digital radio was not tuned to the broadcast and a current geographic direction or direction of motion of the digital radio.

5. A system for enhancing radio advertisement, comprising:

a digital radio selectively tuned to a digital radio broadcast and including a memory;

means for detecting a bumpable advertisement including an identifier within the digital radio broadcast;

means, responsive to detecting the bumpable advertisement within the broadcst, for checking stored advertisements within the memory for a stored advertisement having a higher priority than the bumpable advertisement within the broadcast;

means, responsive to locating a stored advertisement having a higher priority than the bumpable advertisement within the broadcast for suppressing play of the bumpable advertisement within the broadcast by the digital radio and playing the higher priority stored advertisement in lieu of the bumpable advertisement utilizing the digital radio;

means for monitoring the broadcast utilizing the digital radio even when the digital radio is not tuned to the broadcast; and means for storing selected advertisements within the broadcast in the memory when the digital radio is not tuned to the broadcast, wherein the means for storing selected advertisements within the broadcast within the memory when the digital radio is not tuned to the broadcast further comprises means for storing bumpable category advertisements which are broadcast while the digital radio is not tuned to the broadcast;

wherein the means for checking stored advertisements within the memory for a stored advertisement having a higher priority than the bumpable advertisement within the broadcast further comprises:

means for determining whether the bumpable advertisement was previously broadcast during a given broadcast period while the digital radio was tuned to the broadcast;

means for determining whether any stored advertisement was previously broadcast during the given broadcast period while the digital radio was not tuned to the broadcast; and means, responsive to determining that the bumpable advertisement was previously broadcast during the given broadcast period while the digital radio was tuned to the broadcast and identifying at least one bumpable category stored advertisement which was previously broadcast during the given broadcast period while the digital radio was not tuned to the broadcast, for selecting the at least one bumpable category stored advertisement which was previously broadcast during the given broadcast period while the digital radio was not tuned to the broadcast as the higher priority stored advertisement.

6. The system of claim 5, further comprising:

means, responsive to identifying more than one bumpable category stored advertisements which were previously broadcast during the given broadcast period while the digital radio was not tuned to the broadcast, for randomly selecting the one of the bumpable category stored advertisements which were previously broadcast during the given broadcast period while the digital radio was not tuned to the broadcast as the higher priority stored advertisement.

7. The system of claim 5, further comprising:

means, responsive to identifying more than one bumpable category stored advertisements which were previously broadcast during the given broadcast period while the digital radio was not tuned to the broadcast, for selecting an advertisement which commands a largest fee from among the bumpable category stored advertisements which were previously broadcast during the given broadcast period while the digital radio was not tuned to the broadcast as the higher priority stored advertisement.

8. The system of claim 5, further comprising:

means, responsive to identifying more than one bumpable category stored advertisements which were previously broadcast during the given broadcast period while the digital radio was not tuned to the broadcast, for selecting an advertisement as the higher priority stored advertisement based on target geographic locations associated with each of the bumpable category stored advertisements which were previously broadcast during the given broadcast period while the digital radio was not tuned to the broadcast and a current geographic direction or direction of motion of the digital radio.

9. The system of claim 8, further comprising a global positioning satellite receiver.

10. A computer program product within a computer usable medium for enhancing radio advertisement, said computer program product comprising:

instructions for detecting a bumpable advertisement including an identifier within a digital radio broadcast;

instructions, responsive to detecting the bumpable advertisement within the broadcast, for checking stored advertisements within a digital radio tuned to the digital radio broadcast for a stored advertisement having a higher priority than the bumpable advertisement within the broadcast;

instructions, responsive to locating a stored advertisement having a higher priority than the bumpable advertisement within the broadcast, for suppressing play of the bumpable advertisement within the broadcast by the digital radio and playing the higher priority stored advertisement in lieu of the bumpable advertisement utlizing the digital radio;

instructions for monitoring the broadcast utilizing the digital radio even when the digital radio is not tuned to the broadcast; and instructions for storing selected advertisements within the broadcast in the digital radio when the digital radio is not tuned to the broadcast wherein the instructions for storing selected advertisements within the broadcast within the digital radio when the digital radio is not tuned to the broadcast further comprise instructions for storing bumpable category advertisements which are broadcast while the digital radio is not tuned to the broadcast;

wherein the instructions for checking stored advertisements within a digital radio tuned to the digital radio broadcast for a stored advertisement having a higher priority than the bumpable advertisement within the broadcast further comprise:

instructions for determining whether the bumpable advertisement was previously broadcast during a given broadcast period while the digital radio was tuned to the broadcast;

instructions for determining whether any stored advertisement was previously broadcast during the given broadcast period while the digital radio was not tuned to the broadcast; and instructions, responsive to determining that the bumpable advertisement was previously broadcast during the given broadcast period while the digital radio was tuned to the broadcast and identifying at least one bumpable category stored advertisement which was previously broadcast during the given broadcast period while the digital radio was not tuned to the broadcast, for selecting the at least one bumpable category stored advertisement which was previously broadcast during the given broadcast period while the digital radio was not tuned to the broadcast as the higher priority stored advertisement.

11. The computer program product of claim 10, further comprising:

instructions, responsive to identifying more than one bumpable category stored advertisements which were previously broadcast during the given broadcast period while the digital radio was not tuned to the broadcast, for randomly selecting the one of the bumpable category stored advertisements which were previously broadcast during the given broadcast period while the digital radio was not tuned to the broadcast as the higher priority stored advertisement.

12. The computer program product of claim 10, further comprising:

instructions, responsive to identifying more than one bumpable category stored advertisements which were previously broadcast during the given broadcast period while the digital radio was not tuned to the broadcast, for selecting an advertisement which commands a largest fee from among the bumpable category stored advertisements which were previously broadcast during the given broadcast period while the digital radio was not tuned to the broadcast as the higher priority stored advertisement.

13. The computer program product of claim 10, further comprising:

instructions, responsive to identifying more than one bumpable category stored advertisements which were previously broadcast during the given broadcast period while the digital radio was not tuned to the broadcast, for selecting an advertisement as the higher priority stored advertisement based on target geographic locations associated with each of the bumpable category stored advertisements which were previously broadcast during the given broadcast period while the digital radio was not tuned to the broadcast and a current geographic direction or direction of motion of the digital radio.

14. The computer program product of claim 13, further comprising instructions for receiving global positioning satellite data.

* * * * *

UNITED STATES PATENT AND TRADEMARK OFFICE
CERTIFICATE OF CORRECTION

| | |
|---|---|
| PATENT NO. | : 6,952,559 B2 |
| APPLICATION NO. | : 09/793140 |
| DATED | : October 4, 2005 |
| INVENTOR(S) | : Cary L. Bates et al. |

It is certified that error appears in the above-identified patent and that said Letters Patent is hereby corrected as shown below:

At column 9, line 61, delete "preciously" and insert --previously--.

At column 10, line 17, delete "broadost" and insert --broadcast--.

Signed and Sealed this

Twenty-second Day of August, 2006

JON W. DUDAS
*Director of the United States Patent and Trademark Office*